Patented Aug. 1, 1939

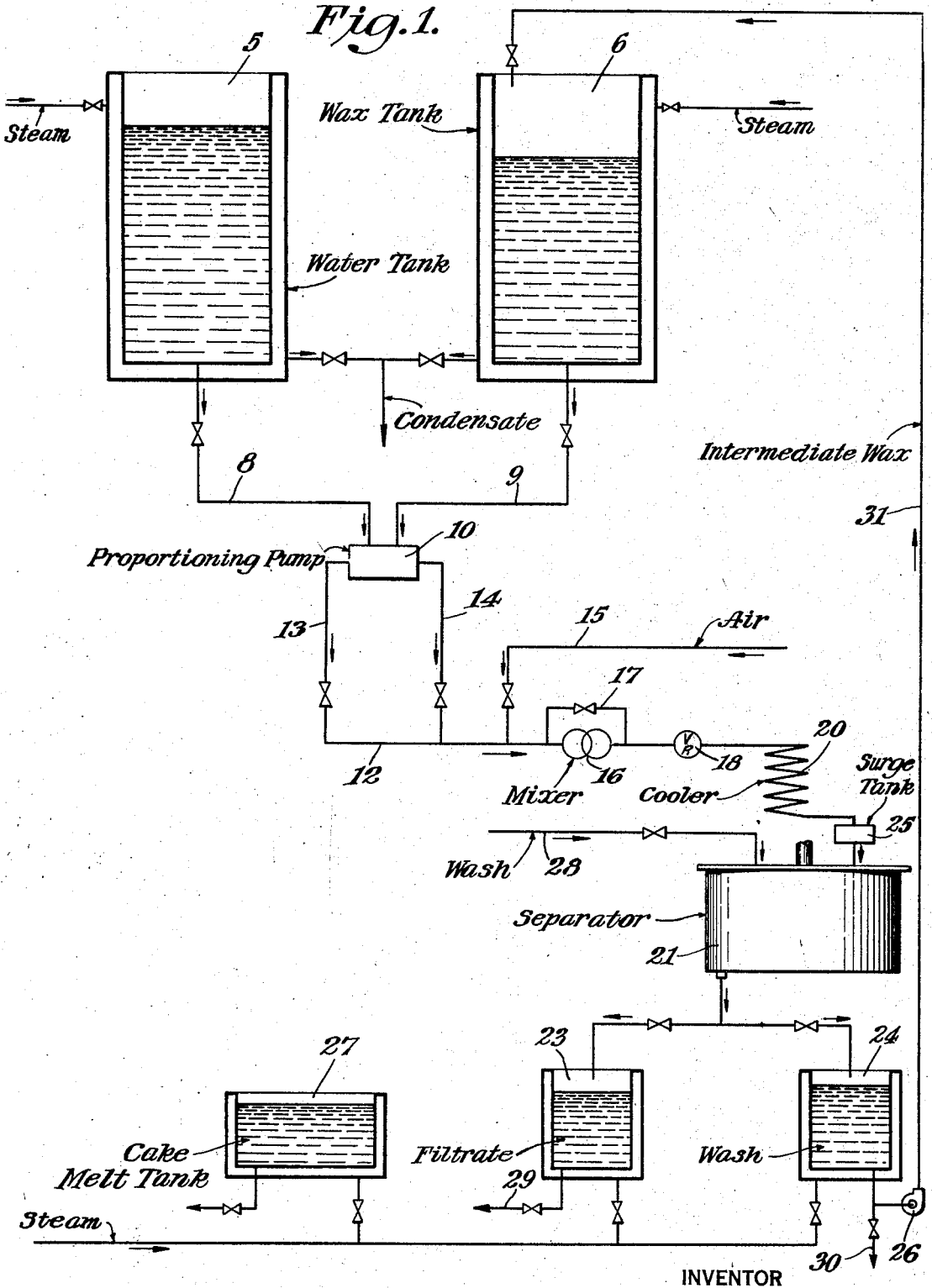

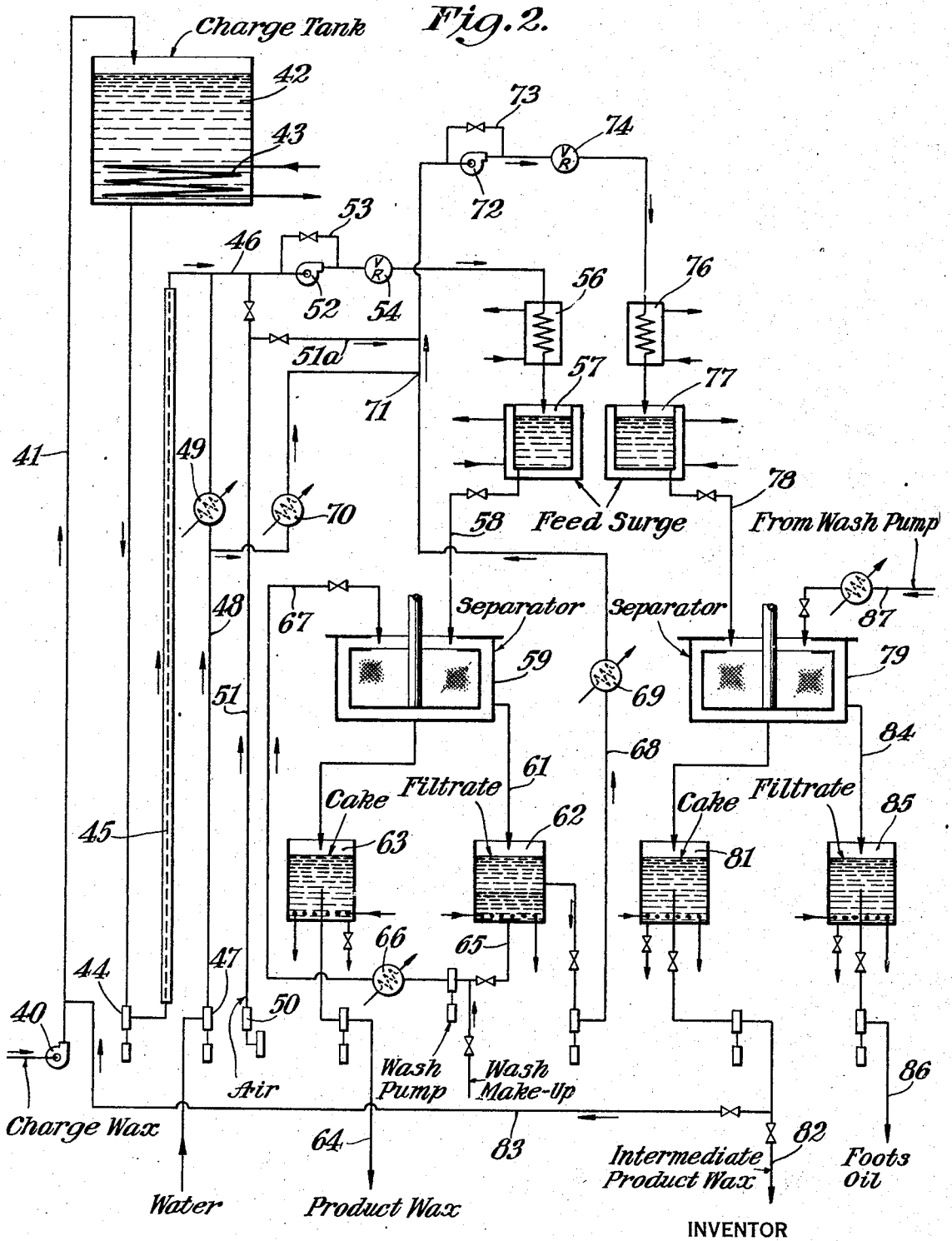

2,168,306

UNITED STATES PATENT OFFICE 2,168,306

METHOD OF SEPARATING WAX

August Henry Schutte, Westfield, N. J.

Application September 29, 1938, Serial No. 232,263

5 Claims. (Cl. 196—17)

This invention relates to a method of and apparatus for separating various melting point waxes from mixtures of waxes or waxes and oils, and is a modification of the disclosures in my prior application Serial No. 208,911 which was filed May 19, 1938.

Primarily the present method includes the simple and economical separation or removal of desirable high melting point waxes from slack wax or intermediate wax fractions. I have found that I can obtain satisfactory yields of the desired end products with a greater economy of operation by employing a more rigorous filtration which removes substantially all of the foots-oil in a single step prior to washing and at a temperature just below the melting point of the wax charge. This reduces the amount of desirable waxes carried over in the foots-oil and repeated washing of the cake at slight temperature increments is unnecessary. This substantially complete removal of foots-oil at temperatures below the melting point of the charge is believed to be unique in the process.

The removal of the oil and low melting point waxes from commercial wax mixtures is accomplished by the formation of an emulsion of the wax mixture with an immiscible fluid which is commonly a liquid such as water, which emulsion is cooled to precipitate the wax after which the emulsion is filtered to remove the foots-oil. I find that I can improve the emulsified condition of the wax and immiscible liquid by the introduction of some gas under pressure prior to the formation of the emulsion.

In addition to the above accomplishments, I find that I am also able to provide a highly flexible installation of apparatus with the minimum of equipment which will accomplish the desired separation of specified melting point waxes with a low unit cost and with the greatest facility for application to different types of charge stock.

The present method is also unique in that as essentially all of the foots-oil is removed at a low temperature where it carries little wax of commercial grade melting points in solution, recycling is normally unnecessary although for certain especially high yields, a second separation of filtrate may be carried out. A great saving in installation cost and operating expense is thus enjoyed; intermediate tankage is reduced and the process is essentially continuous in nature.

In the accompanying drawings, Figure 1 is illustrative of a typical layout of the apparatus which may be used in carrying out the present method; and Figure 2 is a similar typical layout for a modified process.

In the drawings are shown two steam jacketed vessels or tanks 5 and 6, for holding water or other suitable non-solvent liquid and charge wax respectively and maintaining the same at a desired temperature. Valved supply pipes 8 and 9 lead from the water and wax tanks 5 and 6 to a proportioning pump 10 by which predetermined proportions of water and wax may be supplied to the main supply pipe 12 through separate supply lines 13 and 14. Air, or other suitable gas, may also be introduced into this main supply pipe 12 from a suitable source 15.

In a preferred operation, the water and wax, in approximately equal proportions, together with a small volume of air, is intimately mixed in mixer 16 in which the water-wax-air mixture is emulsified until it resembles in appearance whipped cream or shaving lather. This can be accomplished in various forms of apparatus such as an emulsifier, homogenizer, pressure mixing valve or agitator, but I find that a rotary pump arranged for recirculation, as through by-pass 17, is entirely satisfactory. In such apparatus, the net discharge through spring loaded valve 18, is equal in volume to the quantity handled by pump 10.

The creamy emulsion, which is sufficiently stable to permit the subsequent treatment, is then passed through a suitable cooler 20 where the desirable portion of the charge is solidified. The emulsion is then collected in a surge tank 25 from which it is introduced into a separator 21.

In the preferred form of embodiment of my invention, this separator 21 may be a standard centrifugal basket filter having a perforated rotating basket lined on the interior with a foraminous filter medium. This is rotated at such a speed that a high separating or filtering force is obtained. With the particular wax treated as hereinafter described, it is convenient to make this filter media of filter duck or woven wire screening, and it is possible to obtain a filtering force in the range of five hundred to one thousand times gravity. As the filtering force is gravitational by nature, the entire cake is subjected to the force without an external crushing action. This forms a cake which is fine grained, free filtering, porous and permeable to wash liquid which is a substantial advantage of this type of filter. An even drying and washing of the cake is also an advantage of the centrifugal filter, but any other type of separator which can accomplish these objects may be used.

The emulsified material, after being whirled dry in this machine a few minutes, will be substantially free of oil due to the porosity of the cake. This cake is then washed with a non-solvent liquid from wash line 28 which wash liquid will displace the last traces of free oil. It is applied during continued rotation of the centrifuge basket and at a temperature approximately equal to the cake temperature.

The first discharge from the separator 21 is of course the oil contained in the cake, and this is conveniently collected in filtrate tank 23 which may be steam heated to assure easy removal through line 29. The subsequent discharge from the separator 21 is wash liquid which is collected in tank 24 and may be discharged at 30. The cake is easily removed from the separator by any conventional means, such as by an internal scraper, not shown. The cake may then be introduced into cake tank 27 and melted for transfer to storage.

If an intermediate melting point wax is to be removed to obtain the desired final cake melting point, or if an unusually low oil content is desired, it is entirely practical to apply a further wash, which is preferably at a higher temperature. This wash is applied at such a temperature and for such a time period that the porous cake softens, although the wax is not materially melted. The heat applied by the wash penetrates the entire mass very quickly and tends to partially collapse the porous structure. The filtering force, being in the nature of a gravitational force, squeezes out the remaining oil and this is immediately removed by the wash liquid. The porosity of the collapsed cake is still substantial, however, and the wash liquid passes through it freely. A short drying period may follow this washing during which the wash liquid is removed.

It may be found that in some cases, the wax content of the wash liquid collected at 24 is such that it may be desirable to recycle some or all of it and this can be accomplished by pump 26 which will recycle the intermediate wax through line 31 into charge tank 6.

Large capacity and extreme flexibility is obtained with but a small amount of standard apparatus. The proportioning pump is readily adjusted for various wax-non-solvent ratios and it is possible, by valve control, to shut off the air or the water. Whether water-wax-air, water and wax or air and wax dispersions are employed, the purpose is identical, namely, to obtain the wax in a finely divided form as a dispersion in a chemically inert non-solvent fluid.

As an illustration of a typical operation of the process, commercial slack wax having a melting point of approximately 109° F. is liquefied in vessel 6 and water at approximately 105° F. is maintained in vessel 5 by means of their steam jackets. The two liquids are proportioned by pump 10 in the ratio of 1:1 and conveyed to mixing device 16, air having been introduced in small quantities into line 12 prior to the admission of the liquids to the mixing device. The mass, at approximately 105° F., is intimately emulsified or mixed and thereafter passes through coil 20 which cools the material to approximately 100° F., after which it is discharged into surge tank 25 and thence into a centrifugal basket filter 21 and whirled to remove the liquid constituents. During this filtering step a porous permeable cake is produced from which the low melting point oils and waxes are thrown out and collected in tank 23.

If a commercial scale wax having a melting point of approximately 128–130° F. is desired, the permeable filter cake in the basket is washed with water or other suitable liquid at approximately 100° F., the wash liquid with the lower melting point waxes being collected in tank 24.

However, when higher melting point waxes are desired, a wash is used at a slightly higher temperature; for example, if the filter cake is washed with one to one and one-half volumes of water at approximately 135° F., a substantially oil free commercial wax is produced having a melting point of approximately 133° F.

Ordinarily a single separation is sufficient inasmuch as the cake formed is extremely porous and when washed and dried by continuous rotation is a satisfactory end product. There may be cases, however, where the foots-oil which is removed at the temperature of centrifuging, includes valuable quantities of commercial melting point waxes. In such case, it may be desirable to rerun the foots-oil either to improve its quality, or to remove the intermediate waxes, or to provide a maximum yield of the desired melting point waxes.

In Figure 2, I have shown a modification of the process with a slightly different arrangement of apparatus to accomplish the above purpose, and in this case the charge wax is initially introduced by pump 40 and line 41 into charge tank 42, which may be maintained at the desired temperature by heating coil 43. The wax is then removed by pump 44 and passed through cooler 45 which may be a jacketed pipe, to main supply pipe 46. To this supply pipe is fed water or other immiscible liquid through pump 47, feed line 48 and heater 49. It is also desirable to introduce air or other gas under pressure from compressor 50 through line 51 into this main supply pipe 46.

The wax at the correct temperature, immiscible liquid and gas are then intimately mixed in mixer 52 which is preferably a rotary pump which recirculates through by-pass 53, and discharges the net volume of emulsion through the relief valve 54.

As in the prior case, the emulsion is in the form of a lather or of whipped cream consistency and is passed through the cooler 56 for precise temperature control. The cooled emulsion is then collected temporarily in feed surge tank 57 from which it is discharged through line 58 into centrifuge or other separator 59.

Here again the separator is of a type to give a rigorous separation of liquids from solids, the solids being the wax particles which have been congealed in the emulsion, and the liquids being the melted wax portion of the emulsion and the non-solvent. From the separator the filtrate is discharged through the line 61 into the filtrate tank 62, and the cake may be removed by any desired means and introduced into the cake tank 63 for ultimate removal through line 64 as product wax.

The filtrate consists of the foots-oil and wash liquid and the latter is conveniently removed at 65, cooled at 66 and used as wash liquid in line 67. If the filtrate collected at 62 also includes desirable amounts of wax in the foots-oil, this can be further treated in a separate step. As an example, the foots-oil removed at the upper part of filtrate tank 62 is pumped through line 68 with its temperature under control by heat exchanger 69. Air or gas is then introduced through line 51a, and if desired, a non-solvent, heated at 70, may be introduced at 71.

The emulsion is then made by the mixing device 72 having the by-pass 73 with the net volume passing through the relief valve 74 into cooler 76, feed surge tank 77 and thence through line 78 into the second centrifugal separator 79. This centrifugal is preferably operated under a lower temperature than the former one and the cake removed from the tank 81 may be discharged at 82 as an intermediate product wax or recycled through the line 83 to the charge line 41 with the original wax.

The filtrate from the second centrifugal separator which is withdrawn through line 84, is collected in the tank 85 and is withdrawn as the desired foots-oil in the line 86. The centrifugal separator may be washed as by wash liquid in the line 87, if intermediate melting point waxes are produced at 82, which may be connected with the line 87.

Although various wax mixtures and various desired wax products will materially affect the particular flow, it is found that this arrangement of apparatus is especially effective to obtain the maximum yield of a high melting point wax, a high yield of a substantially wax free foots-oil with a minimum yield of intermediate wax. For example, assuming an initial charge of 100 parts of slack wax of 109° F. melting point, such charge is mixed with the desired quantity of immiscible liquid and air with a water-wax ratio of approximately 1:1 and the emulsion formed is cooled to 107° F. and introduced into the centrifugal. After a suitable charge and drying cycle, each of a few minutes, the cake is then washed at 135–145° F. with a resultant wax cake of 134° F. melting point and a filtrate of 104.5° F. melting point. The volume on this wax was found to be 13.2 parts of cake to 86.8 parts of filtrate.

The filtrate collected is then mixed with the immiscible non-solvent liquid, emulsified and cooled to 90° F. and charged to the second centrifuge. The filtrate then removed at 86 has a melting point of 90° F. and accounts for 67.5 parts of the original charge.

Seven per cent of the original charge is removed from the second centrifuge and has a melting point of 123° F. The remainder of the discharge was recycled.

By recycling this intermediate product wax back to the first centrifuge, the product wax removed at 84 increases in volume from 13.2 parts to 25.5 parts and the melting point drops only to 133° F., which was the particularly desired product.

In some cases, especially with a charge product of very low initial oil content (in the range of 8–10% as from solvent dewaxing plants) it will be found that a very precise temperature control will be necessary to assure suitable commercial operation. Under such circumstances, I find that a rerun of some of the foots-oil is desirable as there is less tendency of a slight change in temperature causing a complete solidification of all of the wax. It is comparatively easy to remove the oil and the inhibition of solidification of all of the wax may be quite important. The foots-oil passes directly through the cake during separation so there is no reduction in quantity of cake treated by this addition of foots-oil as the centrifuge charging capacity is unaffected.

While I have shown preferred forms of embodiment of my invention, I am aware that other modifications may be made thereto and I therefore desire a broad interpretation of my invention within the scope and spirit of the description herein and of the claims appended hereinafter.

I claim:

1. The method of removing a specified melting point wax from a mixture of various melting point waxes or waxes and oils, which comprises intimately mixing the wax solution with air, to form a mixture of wax and air with the air finely dispersed throughout the mixture, said wax having a large interfacial area solidifying the desired waxes in the aerated mixture at temperatures below the melting point of the charge, centrifugally separating such mixture to remove substantially all of the liquid material from the solid material which is retained as a cake, subsequently washing the resultant cake with a non-solvent liquid, removing the last traces of liquid and thereafter removing said cake as the desired end product.

2. The method of removing a specified melting point wax from a mixture of various waxes or waxes and oils, which comprises the steps of emulsifying the wax solution with air and water, solidifying the desired waxes in the aerated emulsion at temperatures below the melting point of the charge, separating such emulsified mixture to remove substantially all of the liquid material from the solid material which is retained as a cake, subsequently washing the resultant cake with a non-solvent liquid, removing the last traces of liquid and thereafter removing said cake as the desired end product.

3. The method of removing specific melting point waxes from a wax mixture which comprises mixing the wax mixture with gas and a non-solvent, non-reactive immiscible liquid to form an aerated emulsion, cooling the desired waxes to solidify them in the aerated emulsion, rigorously separating said aerated emulsion under a force in the range of five hundred to one thousand times gravity and depositing the solid material as a cake, decanting the removed liquid to separate wash liquid from wax bearing liquid, washing said solidified wax with the wash liquid and reprocessing the wax bearing liquid by remulsifying, cooling and separating and recycling the cake from the second separation with the charge for the first separation.

4. The method of removing specific melting point waxes from a wax mixture which comprises mixing the wax mixture with gas and a non-solvent, non-reactive immiscible liquid to form an aerated emulsion, cooling the desired waxes to solidify them in the aerated emulsion, rigorously separating said aerated emulsion under a force in the range of five hundred to one thousand times gravity and depositing the solidified wax as a cake, decanting the removed liquid to separate the non-solvent, non-reactive immiscible liquid from the wax bearing liquid material, washing said solidified wax with the non-solvent immiscible liquid and reprocessing the wax bearing liquid by reemulsifying, cooling and separating and recycling the cake from the second separation with the charge for the first separation, the cake of said first separation being washed at a temperature and for a time sufficient to collapse the cake without melting it whereby said cake will squeeze out the remaining free oil.

5. The method of removing a specified melting point wax from a mixture of various waxes or waxes and oils, which comprises the steps of emulsifying the wax solution with air and water, solidifying the desired waxes in the aerated emulsion at temperatures slightly below the melting point of the charge, separating such emulsified mixture to remove substantially all of the liquid material from the solid material which is retained as a cake.

AUGUST HENRY SCHUTTE.